US011226878B1

(12) United States Patent
Beier et al.

(10) Patent No.: US 11,226,878 B1
(45) Date of Patent: Jan. 18, 2022

(54) ACCELERATOR-BASED DATABASE RECOVERY

(71) Applicant: International Business Machines Corporation, Armonk, NY (US)

(72) Inventors: Felix Beier, Haigerloch (DE); Knut Stolze, Hummelshain (DE); Reinhold Geiselhart, Rottenburg-Ergenzingen (DE); Luis Eduardo Oliveira Lizardo, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/189,346

(22) Filed: Mar. 2, 2021

(51) Int. Cl.
*G06F 11/00* (2006.01)
*G06F 11/14* (2006.01)
*G06F 16/27* (2019.01)

(52) U.S. Cl.
CPC ...... *G06F 11/1471* (2013.01); *G06F 11/1469* (2013.01); *G06F 16/275* (2019.01); *G06F 2201/80* (2013.01); *G06F 2201/82* (2013.01)

(58) Field of Classification Search
CPC ............. G06F 11/1446; G06F 11/1451; G06F 11/1458; G06F 11/1469; G06F 11/1471
See application file for complete search history.

(56) References Cited

U.S. PATENT DOCUMENTS

| 6,029,178 A | 2/2000 | Martin |
| 6,226,651 B1 | 5/2001 | Masuda |
| 8,996,458 B2 | 3/2015 | Shang |
| 9,141,670 B2 | 9/2015 | Branscome |
| 9,442,995 B2 | 9/2016 | Pareek |
| 9,632,878 B1* | 4/2017 | Maccanti ............ G06F 16/2365 |
| 9,659,077 B2 | 5/2017 | Chen |
| 9,672,113 B1 | 6/2017 | Rodriques |
| 10,275,507 B2 | 4/2019 | Hrle |
| 10,339,013 B2 | 7/2019 | Chainani |

(Continued)

FOREIGN PATENT DOCUMENTS

| CN | 106294713 A | 1/2017 |
| CN | 110647579 A | 1/2020 |
| EP | 2562657 B1 | 2/2013 |

OTHER PUBLICATIONS

"A log merge method in active-active sites", An IP.com Prior Art Database Technical Disclosure, Authors et. al.: Disclosed Anonymously, IP.com No. IPCOM000254082D, IP.com Electronic Publication Date: May 31, 2018, 6 pages.

(Continued)

*Primary Examiner* — Michael Maskulinski
(74) *Attorney, Agent, or Firm* — David B. Woycechowsky (57) ABSTRACT

A method for linking a selected portion of the data stored in a source database to a set of target database(s), determining that a crash of the source database has occurred, and restoring a latest database state of the source database, with the restoration including: triggering a remote recovery process, and restoring data of the selected portion in the source database from: copy(ies) of data entries stored in one, or more, target database(s) of the set of target database(s), and records from a recovery log file of the source database for data entries that have a later timestamp than corresponding copies of the data entry(ies) as stored in the target database(s) of the set of target database(s).

5 Claims, 7 Drawing Sheets

(56) References Cited

U.S. PATENT DOCUMENTS

| | | | |
|---|---|---|---|
| 10,540,346 B2 | 1/2020 | Martin | |
| 10,657,128 B2 | 5/2020 | Beier | |
| 10,698,883 B2 | 6/2020 | Beier | |
| 2005/0193024 A1 | 9/2005 | Beyer | |
| 2009/0319550 A1 | 12/2009 | Shau | |
| 2011/0131186 A1* | 6/2011 | Whisenant | G06F 11/1658 707/672 |
| 2013/0085999 A1 | 4/2013 | Tung | |
| 2013/0159249 A1 | 6/2013 | Dewall | |
| 2014/0114924 A1 | 4/2014 | Abed | |
| 2014/0279930 A1 | 9/2014 | Gupta | |
| 2015/0205853 A1 | 7/2015 | Ngo | |
| 2015/0293820 A1 | 10/2015 | Doshi | |
| 2015/0370644 A1* | 12/2015 | Graefe | G06F 11/1469 707/624 |
| 2017/0255529 A1* | 9/2017 | Kedia | G06F 16/27 |
| 2018/0137016 A1* | 5/2018 | Brown | G06F 11/1471 |
| 2018/0253483 A1 | 9/2018 | Lee | |
| 2020/0026714 A1 | 1/2020 | Brodt | |
| 2020/0034365 A1 | 1/2020 | Martin | |
| 2020/0210379 A1* | 7/2020 | Kuchibhotla | G06F 11/1461 |
| 2020/0250044 A1* | 8/2020 | Sharma | G06F 11/301 |

OTHER PUBLICATIONS

"ACID Properties of transactions", IBM, last updated Friday, Oct. 9, 2020, 1 page.

"Advanced Topics of Oracle Backup and Recovery", Chapter 15, downloaded from the internet on Oct. 9, 2020, 27 pages, <www.cs.kent.edu/~wfan/link/dbapre/dbatest/54915f.htm>.

"Data Recovery depending on the index segment", An IP.com Prior Art Database Technical Disclosure, Authors et. al.: Disclosed Anonymously, IP.com No. IPCOM000241553D, IP.com Electronic Publication Date: May 11, 2015, 4 pages.

"Dmrefresh—Refresh subscription," IBM, downloaded from the internet on Feb. 15, 2020, 3 pages, <https://www.ibm.com/support/knowledgecenteren/SSTRGZ_11.4.0/com.ibm.cdcdoc.mysql.doc/refs/dmrefresh.html>.

"Recovering Tables and Table Partitions", Oracle, Backup and Recovery User's Guide, downloaded from the internet an Oct. 9, 2020, 8 pages.

"Restore data using a recovery database", Microsoft Docs, Jul. 8, 2020, 4 pages, <https://docs.microsoft.com/en-us/exchange/high-availability/disaster-recovery/restore-data-using-recovery-dbs?view=exchserver-2019>.

"Restoring a source database", Progress Open Edge, downloaded from the internet on Oct. 9, 2020, 1 page, <https://documentation.progress.com/output/ua/OpenEdge_latest/index.html#page/ffr%2Frestoring-a-source-database.html.

Ballard et al., "Smarter Business Dynamic Information with IBM InfoSphere Data Replication CDC," IBM, Redbooks, Mar. 2012, 484 pages, <http://www.redbooks.ibm.com/redbooks/pdfs/sg247941.pdf>.

Becker et al., "IBM DB2 Analytics Accelerator High Availability and Disaster Recovery", IBM Redpaper, REDP-5104-00 was created or updated on May 8, 2014, 40 pages.

Leszczynski, Adam, "Oracle GoldenGate point in time source database recovery", Bersler, Jun. 12, 2018, 14 pages.

Mell et al., "The NIST Definition of Cloud Computing", Recommendations of the National Institute of Standards and Technology, NIST Special Publication 800-145, Sep. 2011, 7 pages.

Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

Saleem, Muhammad Usman, "Cost Optimization for Data Placement Strategies in an Analytical Cloud Service," University of Stullgart, Master's Thesis, Oct. 17, 2016, 106 pages, <https://elib.uni-stuttgart.de/bitstream/11682/9824/1/main-report.pdf>.

Stolze et al., "Autonomous Data Ingestion Tuning in Data Warehouse Accelerators," Datenbanksysteme für Business, Technologie und Web (BTW 2017), 10 pages.

Stolze et al., "Extending Database Accelerators for Data Transformations and Predictive Analytics", Published in Proc. 19th International Conference on Extending Database Technology (EDBT), Mar. 15-18, 2016—Bordeaux, France: ISBN 978-3-89318-070-7, on OpenProceedings.org., 2 pages.

Stolze et al., "Partial Reload of Incrementally Updated Tables in Analytic Database Accelerators," Datenbanksysteme für Business, Technologie und Web (BTW 2019), Mar. 8, 2019, 11 pages, doi:10.18420/btw2019-27, <https://btw.informatik.uni-rostock.de/download/tagungsband/C7-2.pdf>.

List of IBM Patents or Patent Applications Treated as Related, Filed Mar. 2, 2021, 2 pages.

* cited by examiner

100

```
┌─────────────────────────────────────────────────────────────┐
│  102   MAINTAINING LINKED DATABASES                         │
│                                                             │
│  ┌───────────────────────────────────────────────────────┐  │
│  │ 104   SYNCHRONIZING SELECTED PORTIONS OF CONTENT      │  │
│  │       TABLES OF THE SOURCE DATABASE WITH RESPECTIVE   │  │
│  │       PORTIONS IN THE TARGET DATABASE                 │  │
│  └───────────────────────────────────────────────────────┘  │
└─────────────────────────────────────────────────────────────┘
                              │
                              ▼
┌─────────────────────────────────────────────────────────────┐
│  105   UPON A SOURCE DATABASE CRASH                         │
│                                                             │
│  ┌───────────────────────────────────────────────────────┐  │
│  │ 106   ANALYZING TABLE PARTITIONS OF THE CRASHED       │  │
│  │ SOURCE DATABASE ARE STORED IN THE TARGET DATABASE     │  │
│  └───────────────────────────────────────────────────────┘  │
│                              │                              │
│                              ▼                              │
│  ┌───────────────────────────────────────────────────────┐  │
│  │ 108   TRIGGERING A REMOTE RECOVERY PROCESS            │  │
│  └───────────────────────────────────────────────────────┘  │
│                              │                              │
│                              ▼                              │
│  ┌───────────────────────────────────────────────────────┐  │
│  │ 110   RECOVERING ENTRIES IN THE SOURCE DATABASE WITH  │  │
│  │ RECORDS FROM A RECOVERY LOG FILE OF THE SOURE         │  │
│  │ DATADASE FOR ALL THOSE ENTRIES NOT STORED IN THE      │  │
│  │ TARGET DATABASE                                       │  │
│  └───────────────────────────────────────────────────────┘  │
└─────────────────────────────────────────────────────────────┘
```

ACCELERATOR-BASED DATABASE RECOVERY

BACKGROUND

The invention relates generally to databases and more particularly to the recovery of data in a database architecture that includes one or more source database(s) and one or more target database(s). The source database will generally be referred to in the singular here, but may actually be widely distributed in geographical location). The source data can be thought of as an original version of the stored data and the target databases each store a copy of, at least a portion of, the data stored in the source database. This duplicative storage of data is sometimes herein referred to as a "linked database system." It is known that linked database system can restore a "latest database state" of a source database by using the copies of the data at the target databases. In this way, the source database system can recover from a crash where data is lost at the source database system. It is understood that the "latest database state" should reflect the latest version, that is, latest before the crash, of the data in the source database that is feasible to obtain.

SUMMARY

According to one aspect of the present invention, a computer-implemented method for restoring a latest database state of a source database may be provided. The method may comprise maintaining linked databases comprising a source database and a related target database. Thereby, selected partitions of selected tables of the source database may be synchronized with respective partitions of the selected tables in the target database.

Upon a crash of the source database, the method may comprise analyzing which table partitions of the crashed source database may be stored in the target database, triggering a remote recovery process using the table partitions stored in the target database for restoring respective table partitions in the source database, and recovering entries in the source database with records from a recovery log file of the source database for all those entries that are not stored in the target database. Thereby, the records from the recovery log file may have a later timestamp than recovered entries from the target database.

According to another aspect of the present invention, a linked database system for restoring a latest database state of a source database may be provided. The linked database system may comprise a processor and a memory, communicatively coupled to the processor, wherein the memory may store program code portions that, if executed, may enable the processor to maintain linked databases comprising a source database and a related target database, wherein selected partitions of selected tables of the source database may be synchronized with respective partitions of selected tables in the target database.

The stored program code portions that, if executed, may enable the processor, to—in case of a crash of the source database—analyze which table partitions of the crashed source database may be stored in the target database, trigger a remote recovery process using the table partitions stored in the target database for restoring respective table partitions in the source database, and recover entries in the source database with records from a recovery log file of the source database for all those entries that are not stored in the target database and wherein the records from the recovery log file have a later timestamp than recovered entries from the target database.

The computer-implemented method for restoring a latest database state of a source database may offer multiple advantages, technical effects, contributions and/or improvements:

When crashes occur in the source database system, a recovery process must be performed to restore the latest consistent database snapshot. In known technologies, the recovery process loads the source database from a persisted snapshot and incrementally applies changes from the local transaction log to restore the latest committed database state. However, the state-of-the-art recovery processes runs on the source database system, which consumes typically expensive CPU (central processing unit) cycles for parsing log records, etc. This concept can eliminate the resource-wise and comparable slow approach by offloading pans of the recovery workload to less expensive environments, such as the attached target database.

Hence, the processing costs for parsing the source database's transaction log and incrementally applying changes to the source database may be avoided if at least one target database—also denotable as database accelerator—may be attached to the source database management system, that is, the source database that already stores the latest consistent snapshot of the to-be-recovered tables. The target database may be used to respond to answer queries on the replicated database content while the recovery process is running on the source database system. In addition, the target database may be used to restore the source database content with bulk processing strategies that may cause low processing costs on the source database system. Therefore, the source database system's recovery process may analyze which tables/table partitions are stored at which location (local or remotely) and may trigger remote recovery if the data can be restored from a target database. This process may restore entire partitions to the latest consistent snapshot without processing the source database system's transaction log. The latter may only be required as fallback solution for tables that may not have been replicated to a target database beforehand.

The IDAA (IBM DB2 Analytics Accelerator) smart load method is designed for parallel loading of data from the source database system to the target database while controlling the parallelism based on table size and resource utilization on the accelerator. This concept may be reused with inverted data flows to implement source database recovery. Only remaining portions of the source database may be recovered from the source database's recovery log file, either for table or partitions thereof which have no equivalent on any of the available target databases or those recovery log file records having a later timestamp than any corresponding database entries in any of the target databases.

Thereby, the remote recovery may be faster if many changes may be accumulated in the recovery log file of the source DBS (database system) since the last backup that may be used as the base for crash recovery. In the worst case, some logs have been archived already, for example, on a slow tape. If those changes have been synchronized to the target database already, using the latter as a base for the incremental recovery part may be significantly faster.

In the following, additional embodiments of the inventive concept—applicable to the method as well as to the related system—will be described.

According to one advantageous embodiment of the method, the target database may be a plurality of target databases, and the selected partitions of selected tables of the source database may be synchronized with respective partitions of the selected tables with different target databases. Hence, an OLTP (online transaction processing) source database may be supported by a plurality of target databases or accelerators for OLAP (online analytical processing) operations. Therefore, a copy of a table of the source database or a portion of a respective table or different portions of the same table of the source database may be synchronized or replicated to/with one of the target databases. The different target databases may be optimized for use with different analytical requirements and access to different sets of data. There may, for example, be one target database for the financial department, another one for the marketing department and a third one for the manufacturing operations management. All of these different groups may do multi-dimensional data analysis under different aspects and against different sets of data of the source database, now available in a target database.

According to an interesting embodiment of the method, the triggering of a remote recovery process may also comprise initiating parallel recovery streams from different ones of the plurality of target databases. Hence, for restoring the source database, different target database data sets may be used to reconstruct or recover for the source database. This may be a practical approach because different tables of partitions thereof may be stored in different target databases. Additionally, such parallel recovery streams may shorten the time required for the complete recovery process of the source database.

According to one further developed embodiment of the method, a load due to the parallel recovery streams may be balanced between the plurality of target databases according to a predefined optimization rule. Such an embodiment may be advantageous because different resources may be required to established a recovery stream from one of the target databases to the source database; that is, shared resources may have a limited availability like network bandwidth, allocated memory, access to disks and so on. One approach to balance the load may be to minimize the total system load involving all relevant partial systems for the recovery process. Other optimization techniques of the predefined optimization rule may be targeted on a recovery of a predefined subset of the tables of the source database. For example, if the source database supports the complete operation of a mobile service provider, one optimization strategy may be recovering all those tables being required for the billing engine. If the cellular billing engine does not work properly, users of the cellular carrier's services use the services paying method. Such a situation should be avoided or kept to a minimum. Therefore, tables related to the billing engine must be restored with high priority. Rules such as these for priority source database recovery may be configurable.

According to a useful embodiment of the method, the remote recovery process may comprise identifying the to-be-recovered table partitions in the target database, transforming the identified to-be-recovered table partitions, and transmitting the transformed to-be-recovered table partitions from the target database to the source database. Hence, the process for one target database may use metadata from the recovery log file which has definitions of which of the source database's tables were synchronized with which target database. Thus, this information may be used to identify the to-be-recovered table partitions. Transforming the identified table partitions may comprise reformatting or restructuring of the data so that a transmission from the target database to the source database may be performed as quickly as possible. The restructuring may also comprise a reformatting in a way such that the inclusion of the data into the source database may be performed as quickly as possible. Capacity for such re-formatting may be better available on the target system because the source DBMS is busy recovering other database tables anyway.

According to an optional embodiment of the method, the transmitted to-be-recovered table partitions received at the source database may be bulk loaded into the source database. This may be a quicker way than an incremental update of the source database. A recovery strategy engine may determine which alternative may be the one for a quicker recovery of the source database.

According to a useful embodiment of the method, the source database may be optimized for transactions and/or the source database may be a row-oriented relational database management system. The set-up may support typical interactive user oriented applications in which a large number of transactions may be performed per time unit. Besides read operations, there may be insert, update and delete (IUD) operations which may be optimally supported by such an OLTP database.

According to another useful embodiment of the method, the target database may be optimized for analytical operations and/or the target database may be a column-oriented database. Column-oriented databases may be better suited for OLAP operations, that is, for multi-dimensional data analysis involving a comparably large number of tables and data.

According to one preferred embodiment of the method, metadata defining the selected table partitions may be part of the recovery log file. This useful feature may be a single source of truth defining which tables may be defined in which way, how they are synchronized and with which target database and which portions of a selected table they may be synchronized.

According to an advantageous embodiment of the method, the target database may be an in-memory database. The above-discussed OLAP-type of database may be the core concept for the target database which may often require less data than the respective OLTP database—that is, the source database—and analytical operations may require more unpredictable data accesses which may make an in-memory database more suitable as a technical basis for the target database.

According to an advanced embodiment of the method, during the recovery process of the source database, read accesses directed to the source database may be redirected to at least one target database. This way, users may not be aware of the database crash of the source database because one or more of the target databases may act as a temporary replacement for the source database. If certain table partitions may not be available in one of the target databases, the related OLTP transactions against the source database may be put on hold until the respective source database table(s) may have been recovered. Furthermore, the recovery process of the table which may actively hold back transactions may get a higher priority during the overall recovery process of the source database.

According to an interesting embodiment of the method, the target database may be bulk loaded for an initialization of the target database, and updates to the target database may be performed by using entries of the recovery log file of the source database. However, other incremental update methods for the target database method may also work. The initial byte load may guarantee a quicker start for the target database to become operational.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

According to an aspect of the present invention, there is a method, computer program product and/or system that performs the following operations (not necessarily in the following order): (i) linking a selected portion of the data stored in a source database to a set of target database(s) by synchronizing the data of the selected portion with copies of the selected portion in each target database of the set of target database(s); (ii) determining that a crash of the source database has occurred; and (iii) responsive to the determination that a crash has occurred, restoring a latest database state of the source database, with the restoration including: (a) triggering a remote recovery process, and (b) responsive to the triggering of the remote recovery process, restoring data of the selected portion in the source database from: (1) copy(ies) of data entries stored in one, or more, target database(s) of the set of target database(s), and (2) records from a recovery log file of the source database for data entries that have a later timestamp than corresponding copies of the data entry(ies) as stored in the target database(s) of the set of target database(s).

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'latest database state' may denote the database content including the last consistent transaction in the database before the crash happened. That is, the transaction having a commit status and the latest timestamp shall define the latest database state. Additionally, logical time stamps may be used, such as log sequence numbers, which do not require synchronization of system clocks.

The term 'linked databases' may denote at least two databases that are closely related to one another. In the context of this document linked databases may be denoted as those that may store, at least in part, identical data. On the other hand, the primary database—that is, the source database may be optimized for other tasks than the secondary database that is, the target database. It may also be noted that the plurality of target databases may be synchronized with parts of the source database.

The term 'source database'—or 'primary database'—may denote a database being optimized for, for example, fast transactions, that is, online transaction processing. However, databases optimized in such a way—that is, for fast read, write, update operations on the data—may be slow in performing complex queries involving a high number of tables or a large number of data, like in the case of online analytical processing. Additionally, the online analytical processing may slow down the online transaction processing. Therefore, highly optimized database management systems of the just mentioned types of databases may successfully work as a tandem.

The term 'target database'—or 'secondary database' may denote the second database in such a tandem of databases being optimized for different tasks. In the context of the here described concept, the target database may be optimized for online analytical processing. It may store at least portions of the tables and portions of the data in the tables of the source database. The target database may also be comprised of two portions: an in-memory portion for a fast execution of complex and multi-dimensional queries, and a persistent portion which may store the tables and data of the in-memory portion of the target database on the longer-term storage, for example, a hard disk or a flash memory. This way, the target database may be enabled to—in case of a crash of the target database—recover most of its content from the persistent storage. In some contexts, the target database may also be denoted as accelerator or accelerated database.

The term 'selected partitions of selected tables' may denote, at a minimum, at least a subset of the data of one database table may be selected. For different target databases, different subsets of the same table may be used. Alternatively, all data of a table may be synchronized with the target database as well as a plurality of database tables.

The term 'being synchronized' may denote that—in an ideal case—the content in the target database table may be identical with the content of the corresponding table and the source database. However, this may not always be possible because the entries that have just been committed to the source database must be transformed, transmitted and the target database has to be updated. This may require some time in which new updates may already have happened in the source database. That is, the status of the target database may always be slightly behind the source database; however, despite this fact, the respective database tables or portions thereof shall be denoted as being synchronized.

The term 'crash of the source database' may denote that the operation of the source database came to a halt because of an inconsistent entry in the database. This term may also be used in case an error may have occurred for only one table or for one entry in a table.

The term 'crash recovery'- or shortly 'recovery'—may denote a process of reconstructing a state of a database before the crash has happened.

The term 'remote recovery process' may denote the activities happening between the target database and the source database, wherein the target database may act as a data source for the recovery process of the source database.

The term 'recovery log file' may denote a sequential file protocolling operations being performed on a database, particularly, all those operations that modify the data, that is, insert, update and delete operations. The recovery log file may be designed to allow a complete reconstruction of the database. Therefore, also the table definitions of the database may be part of the recovery log file.

The term 'later timestamp' may—in particular, in case of entries in a database—denote that for the entry for which the later timestamp was made at a later point in time. For linked databases, this may require that clocks of the involved different database management systems are completely in sync.

In the following, a detailed description of the figures will be given. All instructions in the figures are schematic. Firstly, a block diagram of an embodiment of the inventive computer-implemented method for restoring a latest database state of a source database is given. Afterwards, further embodiments, as well as embodiments of the linked database system for restoring a latest database state of a source database, will be described.

Figure 1:
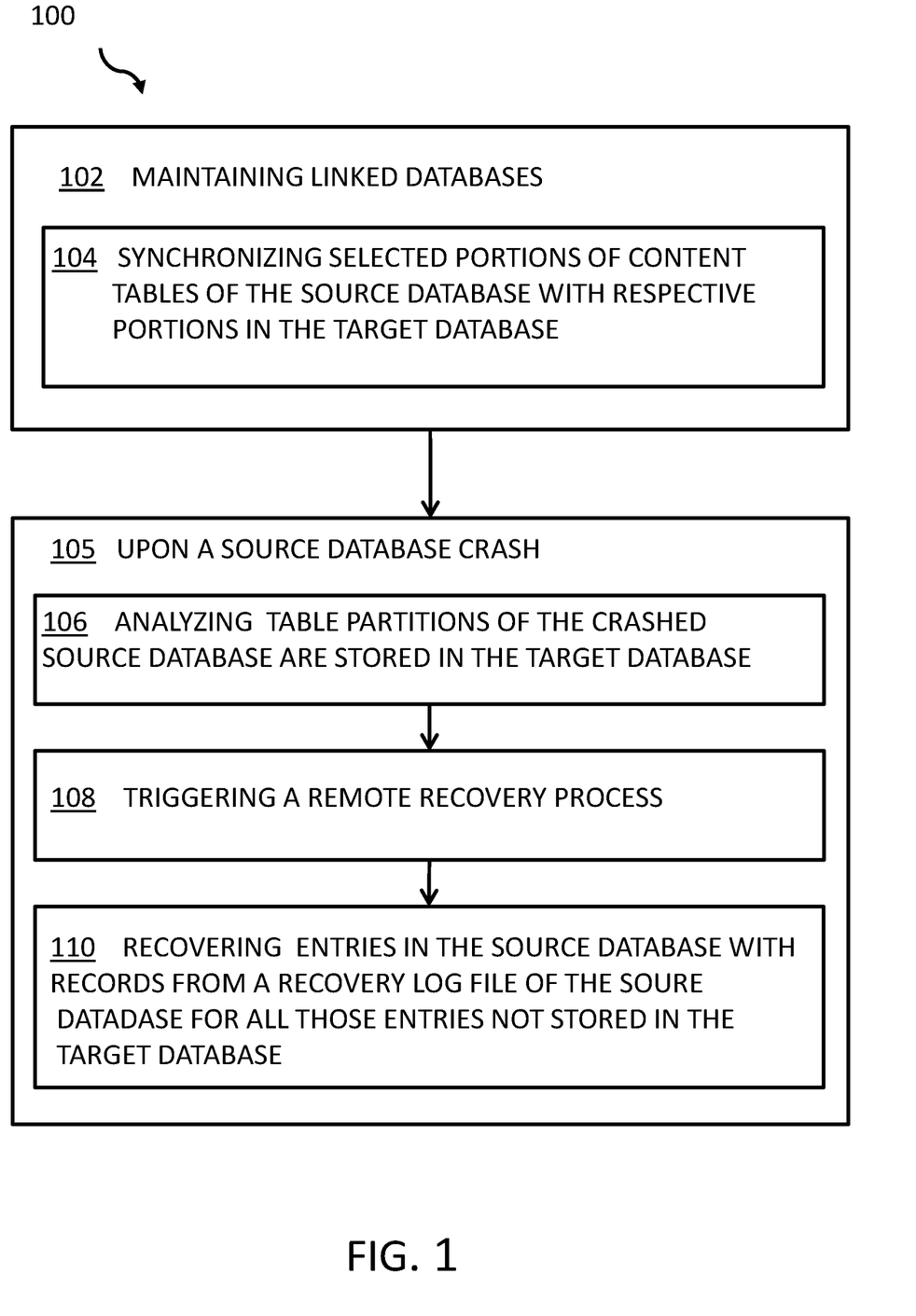
FIG. 1 shows a block diagram of an embodiment of the inventive computer-implemented method for restoring a latest database state of a source database.

FIG. 1 shows a block diagram of a preferred embodiment of the computer-implemented method 100 for restoring a latest database state of a source database. The method 100 comprises maintaining, 102, linked databases comprising a source database and a related target database, wherein selected partitions of selected tables of the source database are synchronized, 104, with respective partitions of the selected tables of the target database.

If upon a crash of the source database, 105, the method 100 comprises also analyzing, 106, which table partitions of the crashed source database are stored in the target database. Thereby, one complete table can also be treated as a table partition. The method 100 comprises further—in case of a source database crash—triggering, 108, a remote recovery process using the table partitions stored in the target database for restoring respective table partition in the source database, and recovering, 110, entries in the source database with records from a recovery log file of the source database for all those entries that are not stored in the target database and wherein the records from the recovery log file have a later timestamp than recovered entries from the target database.

Figure 2:
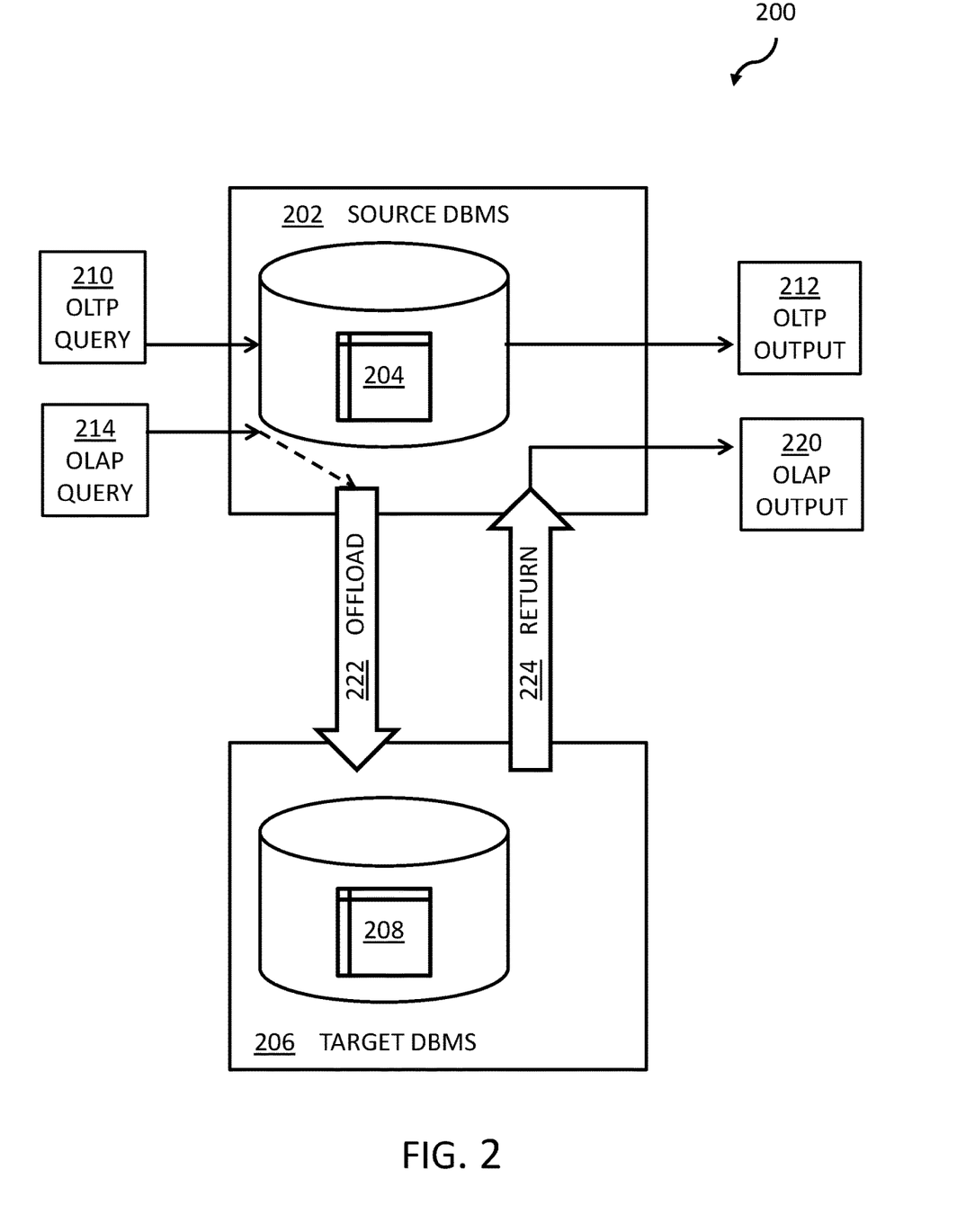
FIG. 2 shows a block diagram of an embodiment of linked databases.

FIG. 2 shows a block diagram of an embodiment 200 of linked databases. The primary or source database 202 receives OLTP queries 210 and OLAP queries 214. Those queries that are identified as OLAP queries 214 are transferred or offloaded, 222, to the secondary or target database 206. The source database 202 comprises a plurality of tables 204 and related stored data. The target database 206 also comprises tables which represent at least a subset of the database tables 204 of the source database 202 and at least a subset of the data in the database tables 208. The target database is also denoted as (database) accelerator.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—for example, column-oriented instead of row-oriented as in the source or OLTP database 202—the target database may return, 224, OLAP results much faster than the source database 202.

Figure 3:
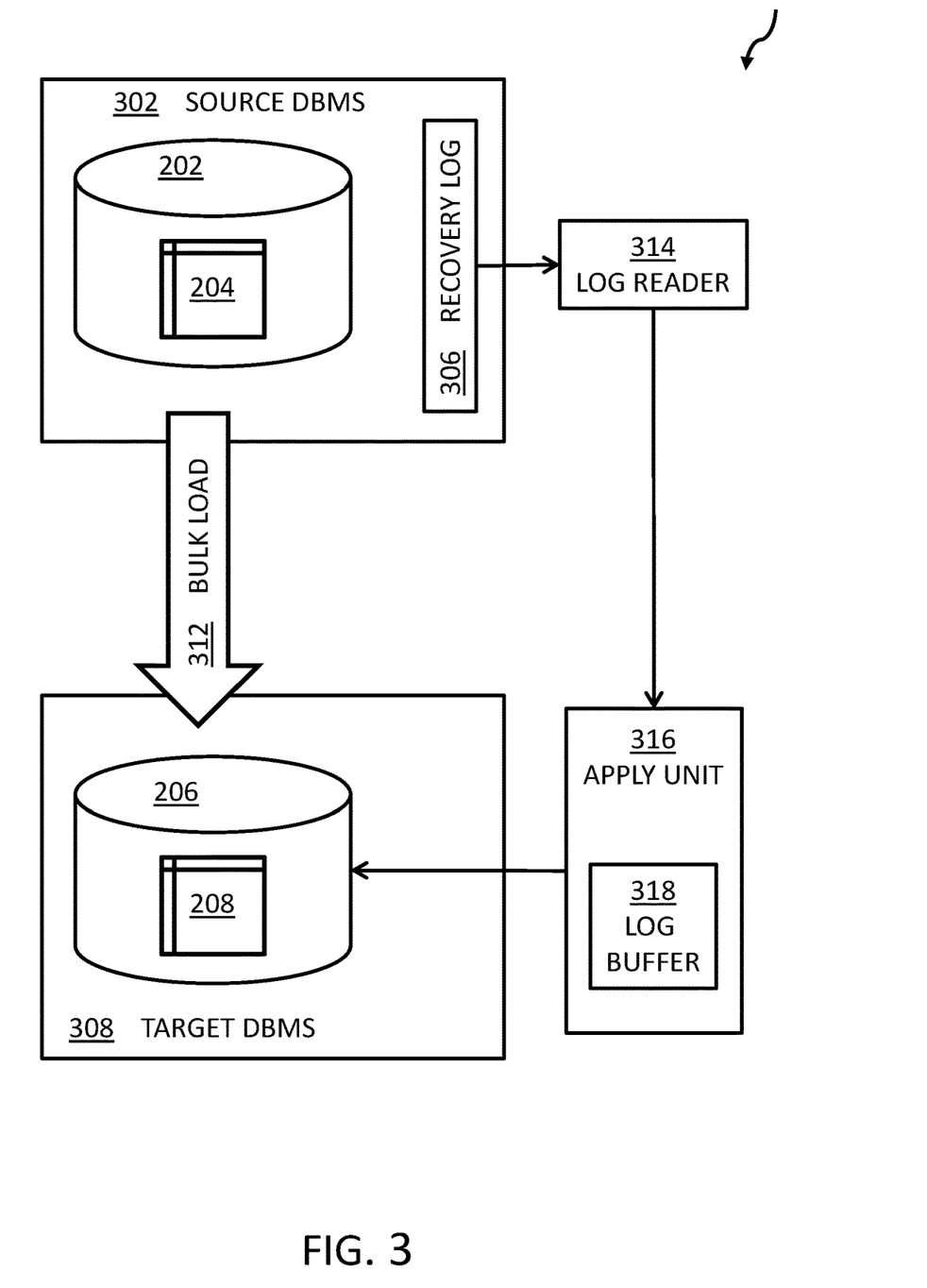
FIG. 3 shows a block diagram of an embodiment of how the target database can be synchronized with the source database.

FIG. 3 shows a block diagram of an embodiment 300 of how the target database can be synchronized with the source database. The source database management system 302 controls the operation of the source database 202 and its related tables 204 (compare to FIG. 2). The same applies to the target database management system 308 for the target database 206 and the related tables 208.

The source database management system 302 also maintains the recovery log file 306 for the source database 202. A log reader or log file reader 314 reading the recovery log file 306 provides these data to the applying unit 316 which applies the changes (that is, insert, update, delete) performed to the source database and also to the target database 206 for the selected tables and the selected set of data. The selected tables and the selected set of data may be a subset of those related tables and data in the source database 202, as defined beforehand. The applying unit 316 can optimize the application of the changes to the target database 206 depending on executed OLAP queries. For this, the log buffer 318 can be instrumental.

For an initialization of the target database 206, a bulk load operation 312 can be performed for performance reasons from the source database 202 to the target database 206.

It may be noted that FIG. 3 does—for reasons of clarity of the inventive concept—not yet show the split of the target database management system into an in-memory portion and a persistent portion of the target database 206 and its tables 208. This will be shown in the next figure.

It may be noted that this synchronization mechanism may represent one of many synchronization techniques. Also, other synchronization techniques may be applicable.

Figure 4:
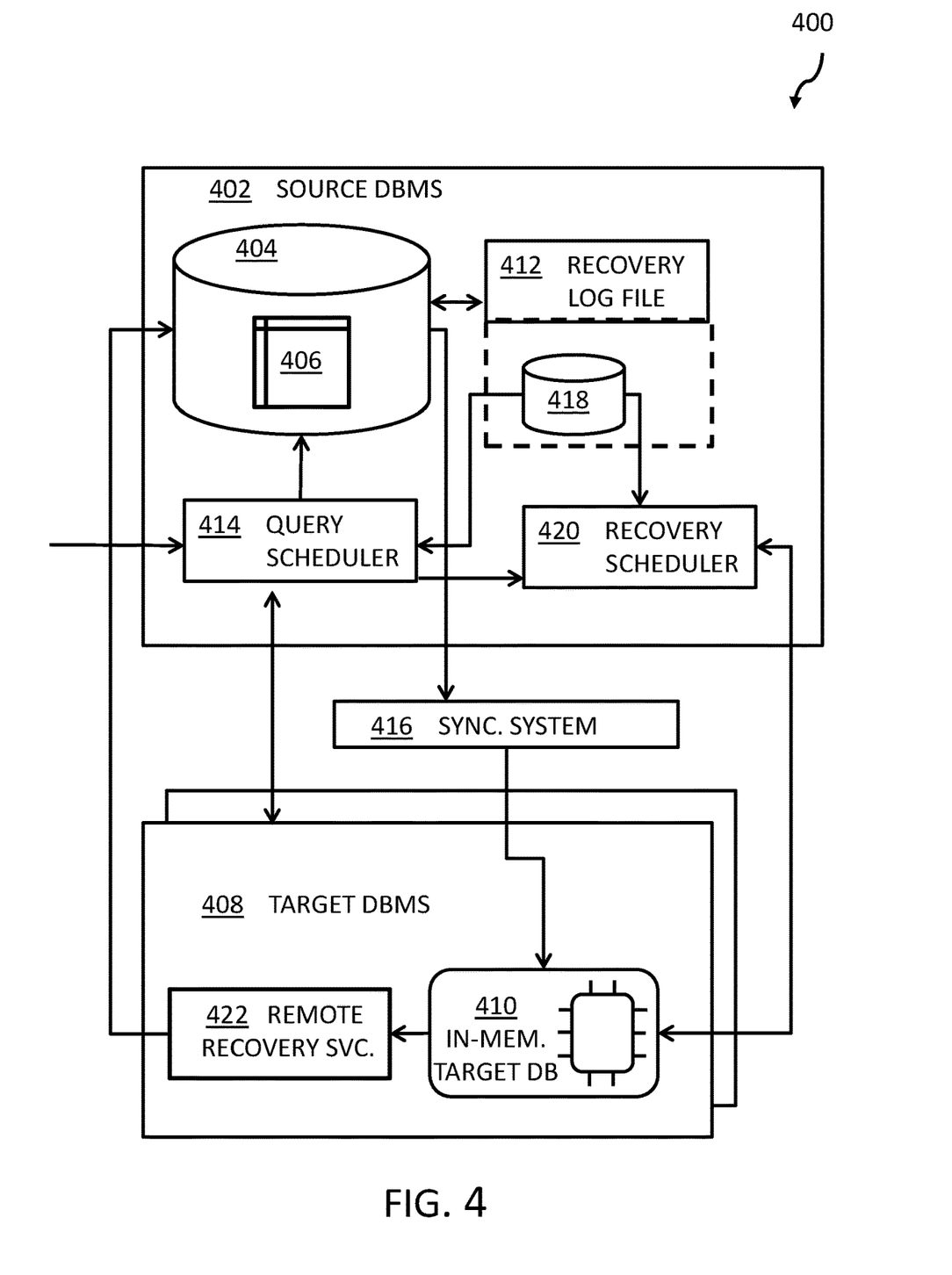
FIG. 4 shows a block diagram of an embodiment of the present invention in a more implementation-near form.

FIG. 4 shows a block diagram of an embodiment 400 of the present invention in a more implementation-near form with the source DBMS 402 comprising the source database 404 with a plurality of database tables 406. On the other side, is one or more target DBMS(s) 408 each with a target database, which is shown as an in-memory target database 410. The above-mentioned processing cost for parsing the source database's recovery log file 412 and incrementally applying changes to the source database—in case of a crash of the source database—can be avoided if at least one accelerator or target database is attached to the source database system that already stores the latest consistent snapshot of the to-be-recovered tables or portions thereof.

Under normal operation conditions, the query scheduler 414 parses an incoming query to the query scheduler 414 to the source database 404 for execution. As discussed above, changes to the source database 404 are going to be synchronized via the synchronization system 416 with the in-memory target database 410. However, if the source database 404 has crashed, the query scheduler 414 can forward or redirect temporarily incoming queries to one or more of the target DBMSs 408 for processing. A prerequisite for this would be that of the addressed data had previously been synchronized with the target database(s).

The concept includes that the data in the source database 404 are used to recover those partitions of the source database 404 that have been crashed and are have become inconsistent.

Typically, bulk load processes can be used to restore those portions of the source database 404 that are available in the one, or one of the plurality of in-memory target database 410. For this, an upfront analysis is required. The metadata storage 418 of the source DBMS 402 is instrumental. It can be part of the recovery log file 412, as indicated by the dashed lines. It is also used by the query scheduler 414 for decisions about which queries to offload to the target DBMS 408, and it is used by the recovery scheduler 420 to analyze which portions of the source database 404 are available in a consistent state in the target DBMS 408, and in particular in the respective in-memory target database(s) 410. Once triggered by the recovery scheduler 420, the remote recovery service 422 and the target DBMS 408 reads the respective portions of databases out of the in-memory target database 410 and supports the loading of these data into the source database 404. This can easily be done by a bulk load process. An advantageous effect of this procedure is that the recovery of the source database 404 is not completely dependent on the recovery log file 412 for a recovery of the source database 404.

After the available portions of databases from the in-memory target database 410 have been helpful in recovering the source database 404 a check is made with the recovery log file 412 of which records do have a later timestamp than the entries in the partially recovered source database 404. Only these changes to the source database 404 are recovered from the recovery log file 412.

Figure 5:
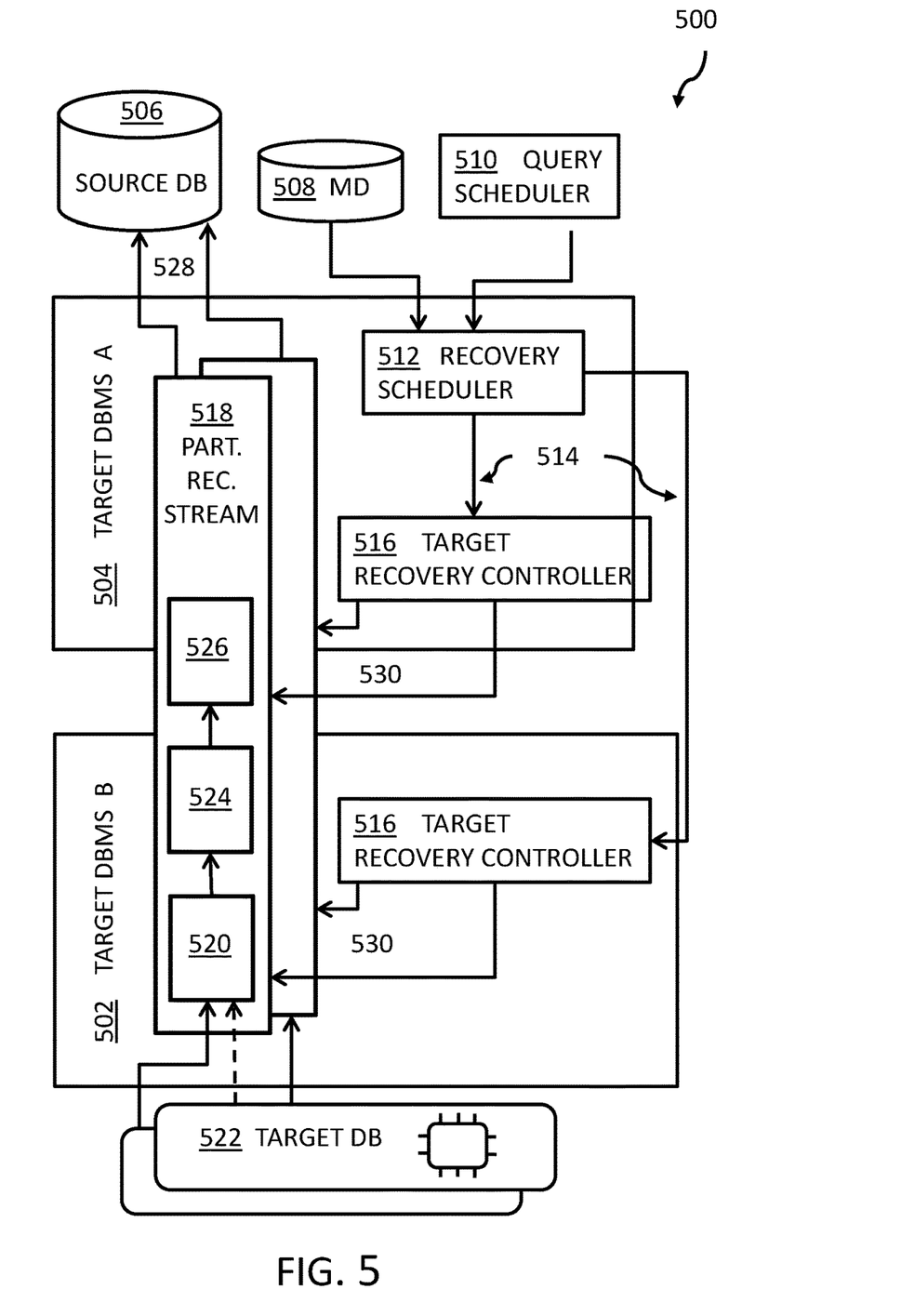
FIG. 5 shows a block diagram of a recovery control and data flow for an embodiment of the present invention.

FIG. 5 shows a block diagram of a recovery control and data flow 500 for an embodiment of the present invention. This figure represents another perspective discussed in detail in the context of FIG. 4. This figure assumes that at least two target DBMSs 502, 504 are available and maintained. The source database is shown with reference numeral 506; also shown are the related metadata storage 508 and the query scheduler 510 (compare to 418, 420 of FIG. 4). Also, as discussed above, the query scheduler requests, 514, tables, or partitions thereof for a recovery from the target recovery controller 516 which creates, 530, and organizes recovery streams 518. These organize and unload 520 from the target database 522, after which a table partition formatting 524 is executed, before a load unit 526 executes a parallel recovery load 528 to the source database 506 in bulk mode. Thereby, typically, different parallel streams 518 originate from different target databases 522; however, it may also be possible to activate parallel streams 518 from the same target database 522, which is indicated in FIG. 5 by the dashed arrow. In this case, the solid arrow from the second (lying behind) target database 522 to the unload module 520 can be ignored.

In other words, the recovery control and data flow 500 works as follows: firstly, lists of tables that need to be recovered are determined, and, with the help of metadata 508, locations (that is, a target database 522) are identified where they are stored. While not all tables have been recovered, a next table to be recovered is determined, for example, based information available to the query scheduler 512.

If the table has been replicated before to at least one target database 522 (or, in other words, at least one accelerator), the list of table partitions that should be recovered is determined from each of the target databases 522. Optionally, a load-balancing based on the partition sizes may be reflected. For each partition list, a recovery of the data from the corresponding target database 522 is requested (530). For that, parallel partition recovery streams 518 are established wherein each stream on the target database 522 unloads a two-be-recovered table partition from the target database 522, transforms the partition data into a format that can be by loaded into the source database 506, and transmits the formatted data to the source database 506, on the source system (not shown), a bulk load of the preformatted recovery data into the source database 506 is performed.

If the required data are not available in one of the target databases, the respective data for a table of the source database are recovered locally using a method that parses the recovery log file (not shown) of the source database 506. While parsing the recovery log file entries, those entries for tables that are recovered from the remote source—in particular from the target database 522—are skipped.

Figure 6:
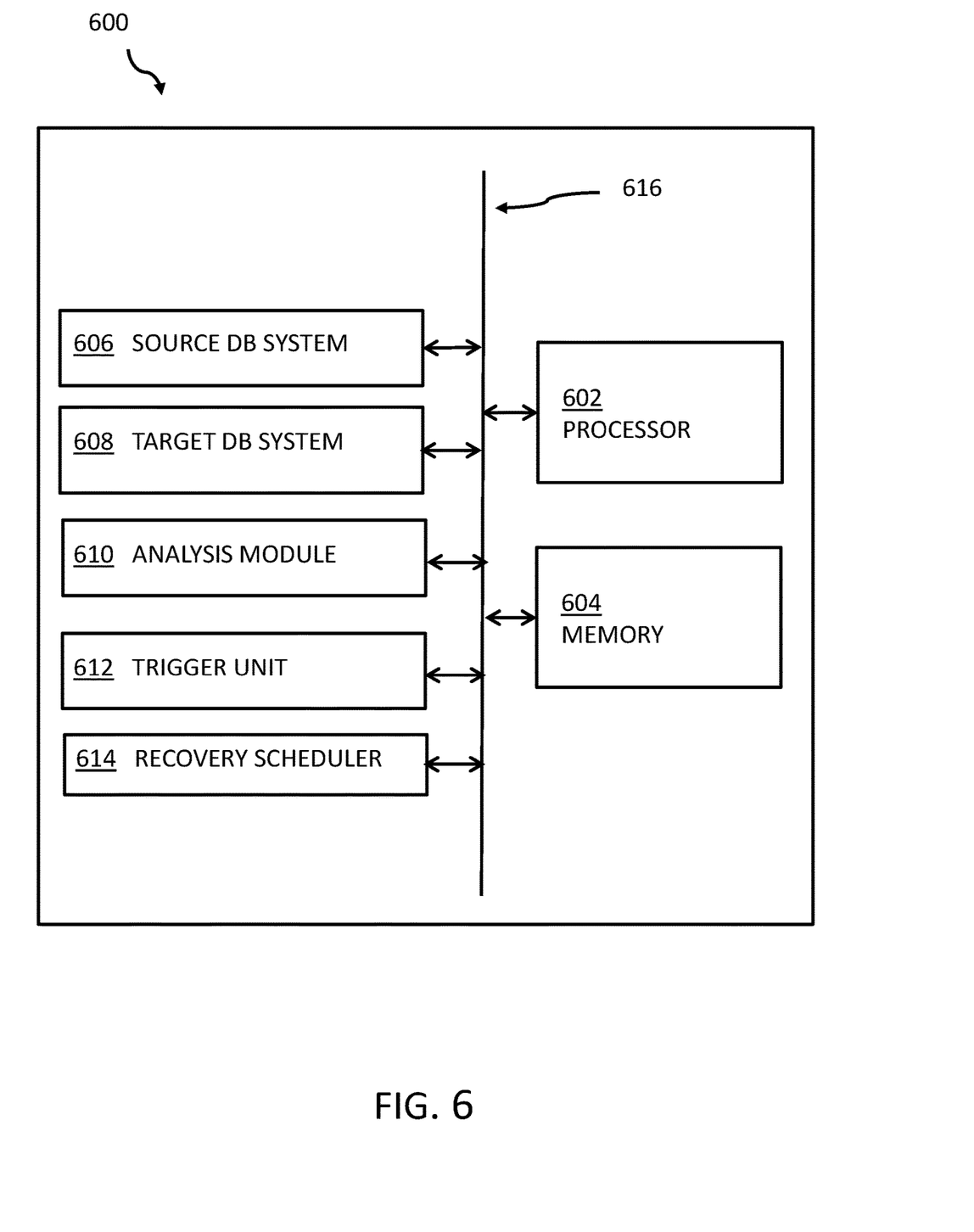
FIG. 6 shows a block diagram of an embodiment of the linked database system for restoring a latest database state of a source database.

FIG. 6 shows a block diagram of an embodiment of the linked database system 600 for restoring a latest database state of a source database (system) 606. The linked database system 600 comprises a processor 602 and a memory 604, communicatively coupled to the processor 602, wherein the memory 604 stores program code portions that, if executed, enable the processor 602, to maintain linked databases, comprise a source database system 606 and a related target database system 608, wherein selected partitions of selected tables of the source database are synchronized with respective partitions of the selected tables in the target database 608.

The stored program code portions that, if executed, enable the processor 602,—in particular, for the case of a crash of the source database—also to analyze—for example, by an analysis module 610—which table partitions of the crashed source database are stored in the target database, trigger—for example, by a trigger unit 612—a remote recovery process using the table partitions stored in the target database for restoring respective table partitions in the source database, and recover—for example, by a recovery scheduler 614—entries in the source database with records from a recovery log file of the source database for all those entries that are not stored in the target database and wherein the records from the recovery log file have a later timestamp than recovered entries from the target database.

It may also be noted that all modules and units of the linked database system 600 may be electrically interconnected for signal and/or data exchange. This may apply to the processor 602, the memory 604, the source database system 606, the target database system 608, the analysis module 610, the trigger unit 612, and the recovery scheduler 614. Also, instead of a 1:1 connection between these modules and units, they may also be connected to a linked database system internal bus system 616 for signaling data exchange.

Figure 7:
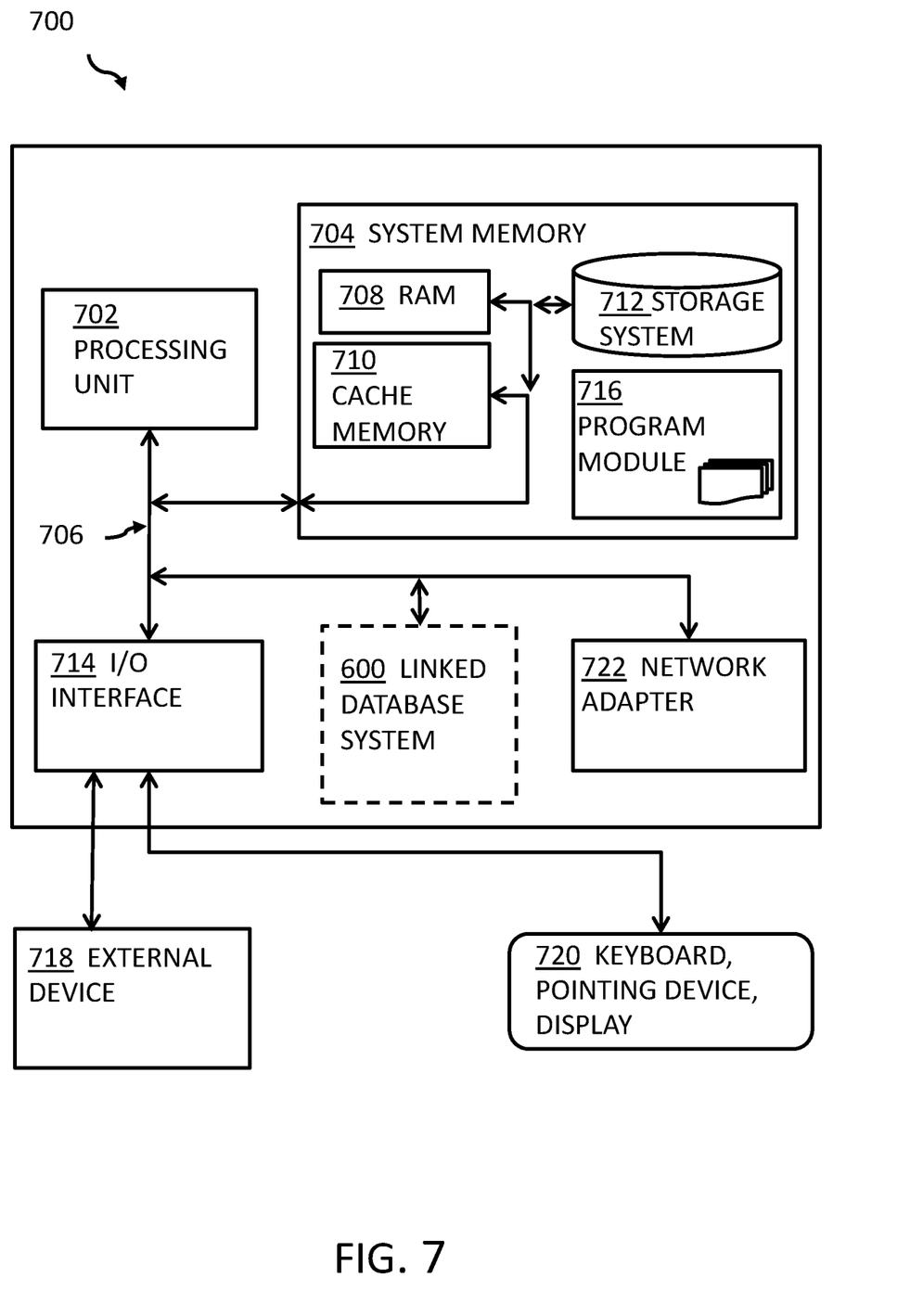
FIG. 7 shows an embodiment of a computing system comprising the inventive linked database system.

Embodiments of the invention may be implemented together with virtually any type of computer, regardless of the platform being suitable for storing and/or executing program code. FIG. 7 shows, as an example, a computing system 700 suitable for executing program code related to the method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (for example, a 'floppy disk'), and an optical disk drive for reading from or writing to a removable, non-volatile optical disk such as a CD-ROM (compact disc read-only memory), DVD-ROM (digital versatile disc read-only memory) or other optical media may be provided. In such instances, each can be connected to bus 706 by one or more data media interfaces. As will be further depicted and described below, memory 704 may include at least one program product having a set (for example, at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (for example, network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (for example, the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the linked database system 600 for restoring a latest database state of a source database may also be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

According to an aspect of the present invention, there is a method, computer program product and/or system for restoring a latest database state of a source database that performs the following operations (not necessarily in the following order: (i) maintaining linked databases comprising a source database and a related target database, wherein selected partitions of selected tables of the source database are synchronized with respective partitions of the selected tables in the target database; and (ii) upon a crash of the source database: (a) analyzing which table partitions of the crashed source database are stored in the target database, (b) triggering a remote recovery process using the table partitions stored in the target database for restoring respective table partitions in the source database, and (c) recovering entries in the source database with records from a recovery log file of the source database for all those entries that are not stored in the target database and wherein the records from the recovery log file have a later timestamp than recovered entries from the target database.

In some embodiments: (i) the target database is a plurality of target databases, and (ii) the selected partitions of selected tables of the source database are synchronized with respective partitions of the selected tables with different target databases.

In some embodiments the triggering a remote recovery process comprises initiating parallel recovery streams from different ones of the plurality of target databases.

In some embodiments a load due to the parallel recovery streams is balanced between the plurality of target databases according to a predefined optimization rule.

In some embodiments the remote recovery process comprises identifying the to-be-recovered table partitions in the target database, transforming the identified to-be-recovered table partitions, and transmitting the transformed to-be-recovered table partitions from the target database to the source database.

In some embodiments the transmitted to-be-recovered table partitions received in the source database are bulk loaded into the source database.

In some embodiments the source database is optimized for transactions and/or wherein the source database is a row-oriented relational database management system.

In some embodiments the target database is optimized for analytical operations and/or the target database is a column-oriented database.

In some embodiments metadata defining the selected table partitions are part of the recovery log file.

In some embodiments the target database is an in-memory database.

In some embodiments during the recovery process, read accesses directed to the source database are redirected to at least one target database.

In some embodiments the target database is bulk loaded for an initialization of the target database, and wherein updates to the target database are performed by using entries of the recovery log file of the source database.

What is claimed is:

1. A computer-implemented method (CIM) comprising:
linking a selected portion of the data stored in a source database to a set of target database(s) by synchronizing the data of the selected portion with copies of the selected portion in each target database of the set of target database(s);
determining that a crash of the source database has occurred; and
responsive to the determination that a crash has occurred, restoring a latest database state of the source database, with the restoration including:
triggering a remote recovery process, and
responsive to the triggering of the remote recovery process, restoring data of the selected portion in the source database from:
copy(ies) of data entries stored in one, or more, target database(s) of the set of target database(s); and
records from a recovery log file of the source database for data entries that have a later timestamp than corresponding copies of the data entry(ies) as stored in the target database(s) of the set of target database(s);
wherein the set of target database(s) includes multiple databases and is a plurality of target databases;
wherein the triggering of a remote recovery process includes initiating parallel recovery streams from at least two different target databases; and
wherein the restoration includes receiving data by the source database through the parallel recovery streams.

2. The CIM according to claim 1 wherein a load due to the parallel recovery streams is balanced between the plurality of target databases according to a predefined optimization rule.

3. The CIM of claim 1 wherein the restoration further includes:
for each data entry of the recovery log file of the source database, determining a log entry time stamp;
for each copy of a data entry of data included in the selected portion, determining a target entry timestamp; and
comparing the log entry timestamps to respectively corresponding target entry timestamps.

4. A computer program product (CPP) comprising:
a set of storage device(s); and
computer code stored collectively in the set of storage device(s), with the computer code including data and instructions to cause a processor(s) set to perform at least the following operations:
linking a selected portion of the data stored in a source database to a set of target database(s) by synchronizing the data of the selected portion with copies of the selected portion in each target database of the set of target database(s),
determining that a crash of the source database has occurred, and
responsive to the determination that a crash has occurred, restoring a latest database state of the source database, with the restoration including:
triggering a remote recovery process; and responsive to the triggering of the remote recovery process, restoring data of the selected portion in the source database from:
- copy(ies) of data entries stored in one, or more, target database(s) of the set of target database(s), and
- records from a recovery log file of the source database for data entries that have a later timestamp than corresponding copies of the data entry(ies) as stored in the target database(s) of the set of target database(s);

wherein the set of target database(s) includes multiple databases and is a plurality of target databases;

wherein the triggering of a remote recovery process includes initiating parallel recovery streams from at least two different target databases; and wherein the restoration includes receiving data by the source database through the parallel recovery streams.

5. The CPP according to claim 4 wherein a load due to the parallel recovery streams is balanced between the plurality of target databases according to a predefined optimization rule.

* * * * *